US009427851B2

(12) United States Patent
Kuo et al.

(10) Patent No.: US 9,427,851 B2
(45) Date of Patent: Aug. 30, 2016

(54) SCREWING MACHINE

(71) Applicant: Quanta Computer Inc., Taoyuan Shien (TW)

(72) Inventors: Hsin-Hung Kuo, Taoyuan County (TW); Lung-Chiang Chu, Taipei (TW); Tung-Chien Tai, Taoyuan County (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 282 days.

(21) Appl. No.: 14/107,579

(22) Filed: Dec. 16, 2013

(65) Prior Publication Data

US 2015/0047475 A1 Feb. 19, 2015

(30) Foreign Application Priority Data

Aug. 14, 2013 (TW) .............................. 102129155 A

(51) Int. Cl.
*B25B 23/04* (2006.01)
*B23P 19/00* (2006.01)
*B23P 19/06* (2006.01)

(52) U.S. Cl.
CPC .............. *B25B 23/04* (2013.01); *B23P 19/001* (2013.01); *B23P 19/005* (2013.01); *B23P 19/06* (2013.01)

(58) Field of Classification Search
CPC ...... B25B 23/04; B23P 19/001; B23P 19/06; B23P 19/005
USPC ........................................ 81/57.37, 430–435
See application file for complete search history.

(56) References Cited

U.S. PATENT DOCUMENTS

| 4,777,851 | A   | * | 10/1988 | Gubitose | ................. | B23P 19/06 81/57.37 |
| 2011/0252927 | A1 | * | 10/2011 | Ota | ....................... | B23P 19/005 81/430 |
| 2014/0116209 | A1 | * | 5/2014 | Chung | ................. | B23P 19/003 81/430 |
| 2015/0151391 | A1 | * | 6/2015 | Kuo | ....................... | B23P 19/06 81/430 |

FOREIGN PATENT DOCUMENTS

| CN | 102390700 A | 3/2012 |
| CN | 202507051 U | 10/2012 |
| TW | M415030 U | 11/2011 |

* cited by examiner

*Primary Examiner* — Hadi Shakeri
(74) *Attorney, Agent, or Firm* — Rabin & Berdo, P.C.

(57) ABSTRACT

A screwing machine includes a machine frame, a locking device, a first moving mechanism, a suction jig, a blowing jig and a second moving mechanism. The locking device has a screwdriver. The first moving mechanism moves the machine frame. The suction jig has a suction head. The blowing jig has a target head. The suction jig and the blowing jig are alternatively mounted on the screwing machine. The suction jig is mounted on the screwing machine by connecting to the locking device. The suction jig sucks to attract at least one screw to the suction head. The blowing jig is mounted on the screwing machine by connecting to the machine frame. The blowing jig blows to supply the screw to the target head. The second moving mechanism connects the locking device to the machine frame for moving the locking device relative to the machine frame.

12 Claims, 3 Drawing Sheets

SCREWING MACHINE

RELATED APPLICATIONS

This application claims priority to Taiwan Application Serial Number 102129155, filed Aug. 14, 2013, which is herein incorporated by reference.

BACKGROUND

1. Field of Invention

The present invention relates to a screwing machine.

2. Description of Related Art

Automatic and semi-automatic screwing machines currently available on the market can be divided into two model types of suction and blowing, as described below.

The suction-type screwing machine mainly utilizes the approach of vacuum suction to draw a screw from the feeder and then enables the fastening action of the screw. The operation is a series of process steps of drawing and fastening of screws. The screwdriver is concealed inside the suction nozzle.

The blowing-type screwing machine utilizes the approach of blowing to supply a screw. The fastening process of the blowing-type is to deliver the screw from the vibration tray to the clamp nozzle by the approach of blowing. The clamp nozzle is closed at the time when the screw is delivered to the clamp nozzle. The screw is then located inside the clamp nozzle. When the screw arrives at the fastening location, the clamp nozzle opens with the screwdriver moving down, and the screw is fastened into the object to be fastened through this process. After the fastening, without going back to the feeder, another screw is blown from the vibration tray to the clamp nozzle, and the fastening action of another screw is directly carried out.

For the screwing machines currently available on the market, when the production line is undergoing operations of either suction-type or blowing-type, the main bodies of the two screwing machines cannot be shared. The main body for suction-type can only be used for the operation of suction-type; the main body for blowing-type can only be used for the operation of blowing-type. If the fastening mode on the production line is switched, i.e., from suction to blowing or from blowing to suction, the whole main body must be switched, which increases the cost and is very inconvenient in the operations.

SUMMARY

A technical aspect of the present invention provides a design of screwing machine allowable for alternative utilizations of suction-type operation and blowing-type operation, which solves the need to replace the whole main body when the operation mode is switched from suction to blowing or from blowing to suction.

According to an embodiment of the present invention, a screwing machine includes a machine frame, a locking device, a first moving mechanism, a suction jig, a blowing jig and a second moving mechanism. The locking device has a screwdriver. The first moving mechanism moves the machine frame. The suction jig has a suction head. The blowing jig has a target head, wherein the suction jig and the blowing jig are alternatively mounted on the screwing machine. When the suction jig is mounted on the screwing machine, the suction jig is connected to the locking device, and the screwdriver of the locking device passes through the suction jig and the suction head of the suction jig. The suction jig conducts a suction to attract at least one screw to the suction head of the suction jig, such that the screwdriver of the locking device fastens the screw to a workpiece. When the blowing jig is mounted on the screwing machine, the blowing jib is connected to the machine frame, wherein the blowing jig conducts a blowing to supply the screw to the target head of the blowing jig. The second moving mechanism connects the locking device to the machine frame, and moves the locking device relative to the machine frame, such that the screwdriver of the locking device passes through the blowing jig to the target head of the blowing jig, and fastens the screw to the workpiece.

In one or more embodiments of the present invention, the first moving mechanism mentioned above includes a first linear moving mechanism, a second linear moving mechanism and a third linear moving mechanism. The first linear moving mechanism moves the machine frame along a first linear direction. The second linear moving mechanism couples with the first linear moving mechanism and moves the machine frame along a second linear direction. The third linear moving mechanism couples with the second linear moving mechanism and moves the machine frame along a third linear direction.

In one or more embodiments of the present invention, at least one of the first linear moving mechanism, the second linear moving mechanism and the third linear moving mechanism is a linear rail.

In one or more embodiments of the present invention, the first linear direction, the second linear direction, and the third linear direction are substantially perpendicular.

In one or more embodiments of the present invention, the second moving mechanism mentioned above includes a fourth linear moving mechanism. The fourth linear moving mechanism moves the locking device along a fourth linear direction relative to the machine frame.

In one or more embodiments of the present invention, the fourth linear direction mentioned above is substantially parallel with at least one among the first linear direction, the second linear direction and the third linear direction.

In one or more embodiments of the present invention, the fourth linear moving mechanism mentioned above is a pneumatic cylinder.

In one or more embodiments of the present invention, the fourth linear moving mechanism mentioned above is a double-acting pneumatic cylinder.

In one or more embodiments of the present invention, the suction jig mentioned above includes a cylindrical body and a vacuum port. The cylindrical body has a passage of the suction jig, wherein an end of the passage of the suction jig is a screwdriver entrance of the suction jig, and another end of the passage of the suction jig is the suction head, wherein, when the suction jig is mounted on the screwing machine, the screwdriver of the locking device passes from the screwdriver entrance of the suction jig through the passage of the suction jig to the suction head. The vacuum port is located on the cylindrical body and is connected to the passage of the suction jig.

In one or more embodiments of the present invention, the screwing machine further includes a vacuum source. The vacuum source is connected to the vacuum port.

In one or more embodiments of the present invention, the blowing jig mentioned above includes a body, a clamp nozzle mechanism and a screw port. The body has a passage of the blowing jig, wherein end of the passage of the blowing jig is a screwdriver entrance of the blowing jig. The clamp nozzle mechanism is connected to another end of the passage of the blowing jig. The clamp nozzle mechanism defines the target head. The screw port is located on the body and is connected to the passage of the blowing jig.

In one or more embodiments of the present invention, the screwing machine further includes a screw feeding duct, a screw feeding device, and a gas source. The screw feeding duct is connected to the screw port. The screw feeding device is connected to the screw feeding duct for supplying the screw to the screw feeding duct. The gas source is connected to the screw feeding duct for supplying the screw to the target head, wherein, when the blowing jig is mounted on the screwing machine and the second moving mechanism drives to move the locking device relative to the machine frame, the screwdriver of the locking device passes through the passage of the blowing jig to the target head of the blowing jig.

When compared with prior art, the embodiments of the present invention mentioned above have at least the following advantages:

(1) In the embodiment of the present invention, the suction jig is connected to the locking device of the screwing machine, and the vacuum port of the suction jig is connected to the vacuum source of the screwing machine. Thus, through this simple procedure of installation, the screwing machine can carry out suction-type operation.
(2) In the embodiment of the present invention, the blowing jig is connected to the machine frame of the screwing machine, and the screw port of the blowing jig is connected to the screw feeding duct of the screwing machine. Then, the screw feeding duct is connected to the screw feeding device of the screwing machine and the gas source of the screwing machine. Thus, through this simple procedure of installation, the screwing machine can carry out blowing-type operation.
(3) In the embodiment of the present invention, the suction jig and the blowing jig are alternatively mounted on the screwing machine. Thus, this solves the need to replace the whole main body of the screwing machine currently available on the market when the operation is switched, i.e., from suction to blowing or from blowing to suction.

It is to be understood that both the foregoing general description and the following detailed description are by examples, and are intended to provide further explanation of the present invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
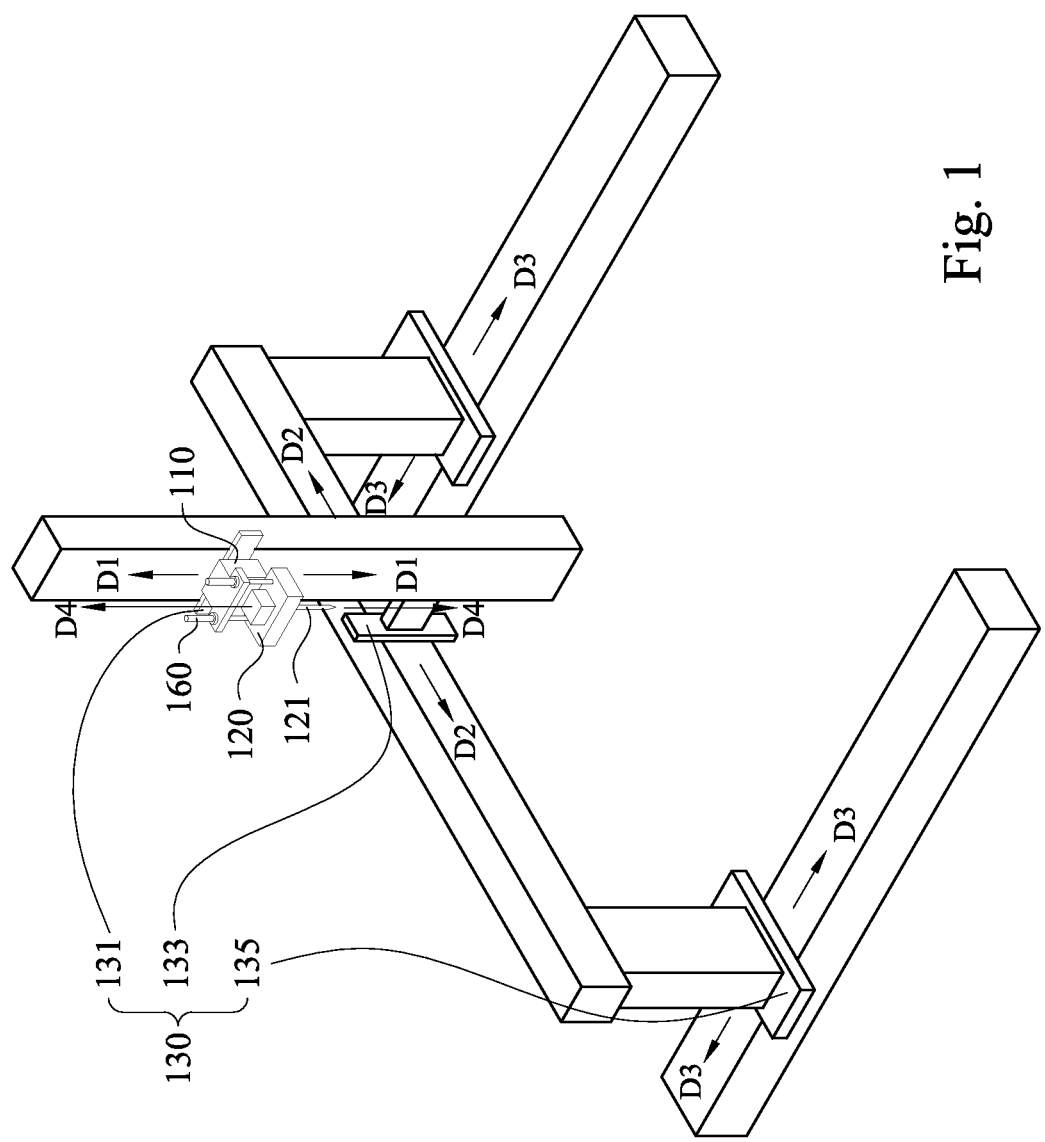
FIG. 1 is a 3-dimensional drawing of the screwing machine before the mounting of a suction jig or a blowing jig according to one embodiment of the present invention.

Drawings will be used below to disclose a plurality of embodiments of the present invention. For the sake of clear illustration, many practical details will be explained together in the description below. However, it is appreciated that, the practical details should not be used to limit the present invention. That is, in some embodiments of the present invention, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Figure 2:
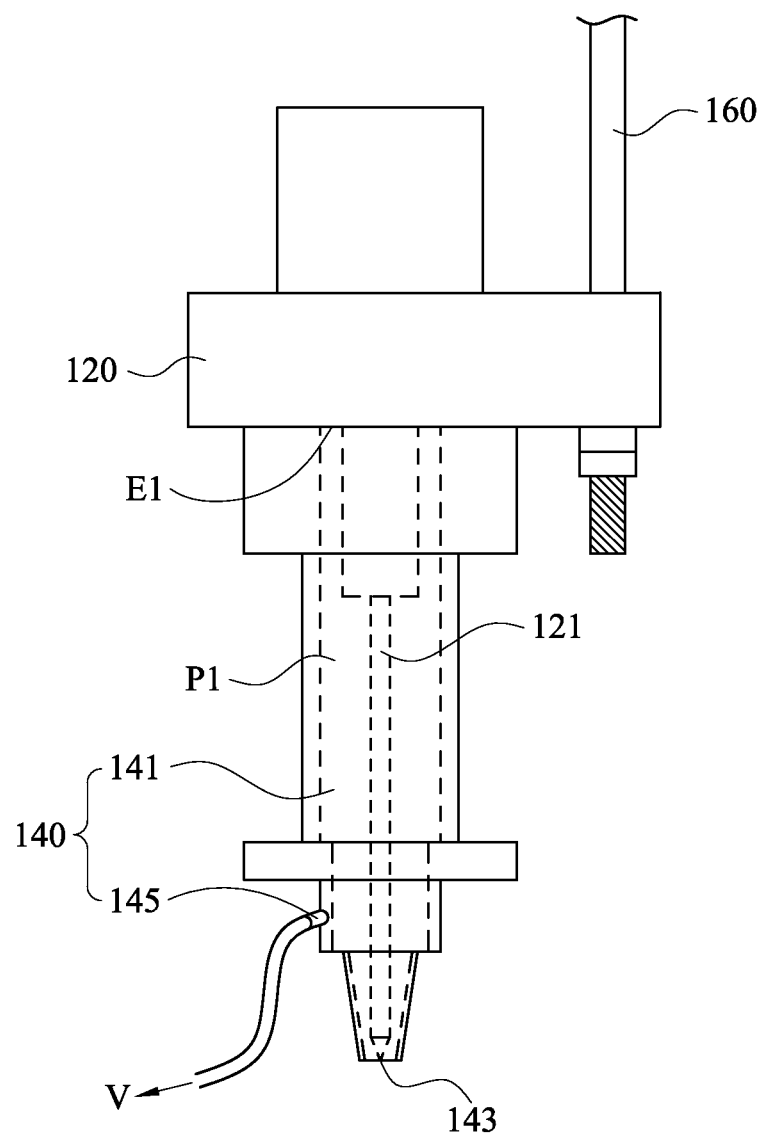
FIG. 2 is a schematic drawing of the screwing machine of FIG. 1 connected with a suction jig.
Figure 3:
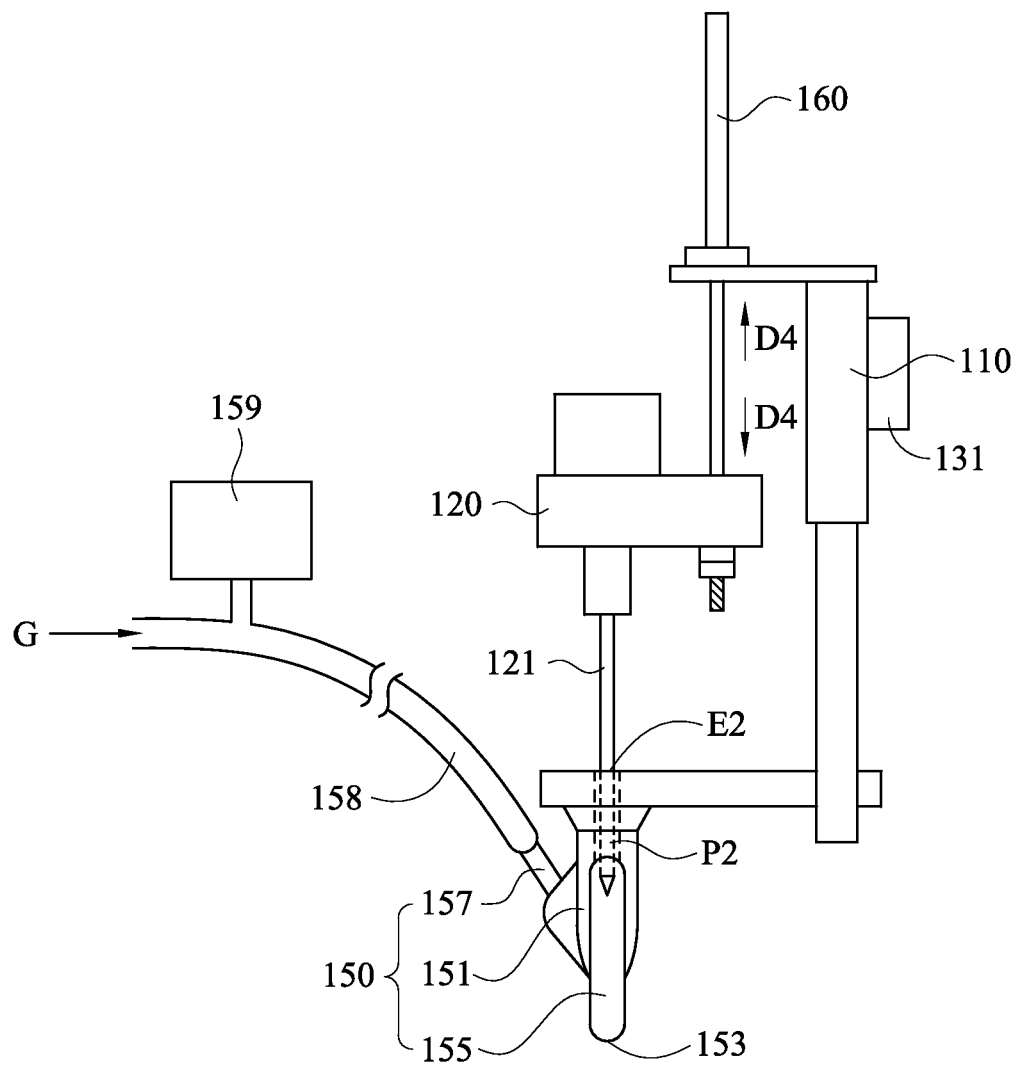
FIG. 3 is a schematic drawing of the screwing machine of FIG. 1 connected with a blowing jig.

FIG. 1 is a 3-dimensional drawing of the screwing machine 100 before the mounting of a suction jig 140 or a blowing jig 150 according to one embodiment of the present invention. FIG. 2 is a schematic drawing of the screwing machine 100 of FIG. 1 connected with a suction jig 140. FIG. 3 is a schematic drawing of the screwing machine 100 of FIG. 1 connected with a blowing jig 150. As shown in the figures, a screwing machine 100 includes a machine frame 110, a locking device 120, a first moving mechanism 130, a suction jig 140, a blowing jig 150 and a second moving mechanism 160. The locking device 120 has a screwdriver 121. The first moving mechanism 130 moves the machine frame 110. The suction jig 140 has a suction head 143. The blowing jig 150 has a target head 153, wherein the suction jig 140 and the blowing jig 150 are alternatively mounted on the screwing machine 100. When the suction jig 140 is mounted on the screwing machine 100, the suction jig 140 is connected to the locking device 120, and the screwdriver 121 of the locking device 120 passes through the suction jig 140 and the suction head 143 of the suction jig 140. The suction jig 140 conducts a suction to attract at least one screw to the suction head 143 of the suction jig 140, such that the screwdriver 121 of the locking device 120 fastens the screw to a workpiece. When the blowing jig 150 is mounted on the screwing machine 100, the blowing jib 150 is connected to the machine frame 110, wherein the blowing jig 150 conducts a blowing to supply the screw to the target head 153 of the blowing jig 150. The second moving mechanism 160 connects the locking device 120 to the machine frame 110, for moving the locking device 120 relative to the machine frame 110, such that the screwdriver 121 of the locking device 120 passes through the blowing jig 150 to the target head 153 of the blowing jig 150, and fastens the screw to the workpiece.

As shown in FIG. 1, the first moving mechanism 130 mentioned above includes a first linear moving mechanism 131, a second linear moving mechanism 133 and a third linear moving mechanism 135. The first linear moving mechanism 131 moves the machine frame 110 along a first linear direction D1. The second linear moving mechanism 133 couples with the first linear moving mechanism 131, and moves the machine frame 110 along a second linear direction D2. The third linear moving mechanism 135 couples with the second linear moving mechanism 133, and moves the machine frame 110 along a third linear direction D3. The first linear direction D1, the second linear direction D2 and the third linear direction D3 are substantially perpendicular. Moreover, at least one of the first linear moving mechanism 131, the second linear moving mechanism 133 and the third linear moving mechanism 135 is a linear rail. Thus, the machine frame 110 can move to the position where a screw is required to be fastened to, and can perpendicularly move to or away from this position.

As shown in FIGS. 1 & 3, the second moving mechanism 160 mentioned above includes a fourth linear moving mechanism. The fourth linear moving mechanism moves the locking device 120 along a fourth linear direction D4 relative to the machine frame 110. Moreover, the fourth linear direction D4 is substantially parallel with at least one of the first linear direction D1, the second linear direction D2 and the third linear direction D3. In this embodiment, the fourth linear direction D4 is substantially parallel with the first linear direction D1. Thus, apart from the movement with the machine frame 110 along the first linear direction D1, the second linear direction D2 and the third linear direction D3, the locking device 120 can also move along the fourth linear direction D4 relative to the machine frame 110. In this embodiment, only in the blowing-type operation, the locking device 120 is required to move along the fourth linear direction D4 relative to the machine frame 110.

As shown in FIGS. 1-3, the fourth linear moving mechanism mentioned above can be a pneumatic cylinder, or even a double-acting pneumatic cylinder. This double-acting pneumatic cylinder is connected to the machine frame 110, and is used to push down or pull up the locking device 120, such that the locking device 120 can move away from or near to the machine frame 110 along the fourth linear direction D4. The motion of movement away from or near to the machine frame 110 is under the control of the extension and retraction of the double-acting pneumatic cylinder.

As shown in FIG. 2, the suction jig 140 mentioned above includes a cylindrical body 141 and a vacuum port 145. The cylindrical body 141 has a passage P1 therein, wherein an end of the passage P1 is a screwdriver entrance E1, and another end of the passage P1 is the suction head 143. When the suction jig 140 is mounted on the screwing machine 100, the suction jig 140 is connected to the locking device 120, and the screwdriver 121 of the locking device 120 passes from the screwdriver entrance E1 of the suction jig 140 through the passage P1 of the suction jig 140 to the suction head 143. The screwing machine 100 further includes a vacuum source V. The vacuum source V is connected to the vacuum port 145. When the vacuum source V is switched on, the suction jig 140 conducts a suction to attract at least one screw to the suction head 143. Subsequently, as driven by the first linear moving mechanism 131, the second linear moving mechanism 133 and the third linear moving mechanism 135, the suction jig 140 moves to the position where the screw is required to be fastened to. Then, the screwdriver 121 of the locking device 120 fastens the screw to a workpiece.

In this embodiment, the suction jig 140 and the blowing jig 150 are alternatively mounted on the screwing machine 100. As shown in FIG. 3, the blowing jig 150 mentioned above includes a body 151, a clamp nozzle mechanism 155 and a screw port 157. The body 151 has a passage P2 therein, wherein an end of the passage P2 is a screwdriver entrance E2. The clamp nozzle mechanism 155 is connected to another end of the passage P2. The clamp nozzle mechanism 155 defines the target head 153. The screwing machine 100 further includes a screw feeding duct 158, a screw feeding device 159, and a gas source G. The screw feeding duct 158 is connected to the screw port 157. The screw feeding device 159 is connected to the screw feeding duct 158, for supplying the screw to the screw feeding duct 158. The gas source G is connected to the screw feeding duct 158, conducting a blowing for supplying the screw to the target head 153. When the blowing jig 150 is mounted on the screwing machine 100, the blowing jig 150 is connected to the machine frame 110. In this embodiment, the double-acting pneumatic cylinder mentioned above works with the blowing jig 150. Before the gas source G conducts a blowing to supply a screw to the target head 153 of the blowing jig 150, the double-acting pneumatic cylinder pulls up the locking device 120, such that the gas source G conducts a blowing to supply the screw to the target head 153 of the blowing jig 150. After the screw arrives at the target head 153, the double-acting pneumatic cylinder pushes down the locking device 120, such that the locking device 120 moves away from the machine frame 110, and the screwdriver 121 of the locking device 120 passes through the passage P2 of the blowing jig 150 to the target head 153 of the blowing jig 150. Then, the screwdriver 121 of the locking device 120 fastens the screw to a workpiece.

With regards to the various types and lengths of the screws to be fastened, the operation mode of the screwing machine 100 can be chosen as suction-type or blowing-type. When the blowing-type is adopted, as the blowing jig 150 conducts a blowing to supply screws to the target head 153 of the blowing jig 150, such that the blowing jig 150 is not required to move to the supply of screws for feeding, the speed of operation is relatively faster. However, in adopting the blowing-type operation, there is a certain limitation for the size of the screws. Firstly, the diameter of the screw head cannot be larger than the inner diameter of the screw feeding duct 158. Secondly, the ratio of the length of the screw to the diameter of the screw head has to reach a certain value. If the length of the screw supplied is too short, such that the ratio of the length of the screw to the diameter of the screw head is smaller than a certain value, the screw will probably rollover inside the screw feeding duct 158 during the supplying process. In this way, the screw cannot reach the blowing jig 150 with a correct posture, thus affecting the operation of the screwing machine 100.

Relative to the blowing-type operation, the suction-type operation is not limited to the size of the screws supplied. However, as the suction jig 140 is required to move to the supply of screws for feeding, the speed of operation is relatively slower.

In this embodiment, the suction jig 140 and the blowing jig 150 are alternatively mounted on the screwing machine 100. Thus, the operation mode of the screwing machine 100 can be chosen as suction-type or blowing-type upon requirement.

Although the present invention has been described in considerable detail with reference to certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A screwing machine being in combination with:
   a suction jig having a suction head; and
   a blowing jig having a target head,
   the screwing machine comprising:
   a machine frame;
   a fastening device having a screwdriver;
   a first moving mechanism for moving the machine frame, wherein the suction jig and the blowing jig are alternatively mounted on the screwing machine; when the suction jig is mounted on the screwing machine, the suction jig is connected to the fastening device, and the screwdriver of the fastening device passes through the suction jig and the suction head of the suction jig; the suction jig conducts a suction to attract at least one first screw to the suction head of the suction jig, such that the screwdriver of the fastening device fastens the first screw to a workpiece, and, when the blowing jig is mounted on the screwing machine, the blowing jig is connected to the machine frame, wherein the blowing jig conducts a blowing to supply a second screw to the target head of the blowing jig; and a second moving mechanism connecting the fastening device to the machine frame, for moving the fastening device relative to the machine frame, such that when the blowing jig is connected to the machine frame, the screwdriver of the fastening device passes through the blowing jig to the target head of the blowing jig for fastening the second screw to the workpiece, and when the suction jig is connected to the fastening device, the screwdriver of the fastening device passes through the suction jig to the suction head for fastening the first screw to the workpiece.

2. The screwing machine of claim 1, wherein the first moving mechanism comprises:

a first linear moving mechanism for moving the machine frame along a first linear direction;

a second linear moving mechanism coupled with the first linear moving mechanism for moving the machine frame along a second linear direction; and a third linear moving mechanism coupled with the second linear moving mechanism for moving the machine frame along a third linear direction.

3. The screwing machine of claim 2, wherein at least one of the first linear moving mechanism, the second linear moving mechanism and the third linear moving mechanism is a linear rail.

4. The screwing machine of claim 2, wherein the first linear direction, the second linear direction, and the third linear direction are substantially perpendicular to each other.

5. The screwing machine of claim 2, wherein the second moving mechanism comprises:

a fourth linear moving mechanism for moving the fastening device along a fourth linear direction relative to the machine frame.

6. The screwing machine of claim 5, wherein the fourth linear direction is substantially parallel with at least one of the first linear direction, the second linear direction and the third linear direction.

7. The screwing machine of claim 5, wherein the fourth linear moving mechanism is a pneumatic cylinder.

8. The screwing machine of claim 5, wherein the fourth linear moving mechanism is a double-acting pneumatic cylinder.

9. The screwing machine of claim 1, wherein the suction jig comprises:

a cylindrical body having a passage of the suction jig, wherein an end of the passage of the suction jig is a screwdriver entrance of the suction jig, and another end of the passage of the suction jig is the suction head, wherein, when the suction jig is mounted on the screwing machine, the screwdriver of the fastening device passes from the screwdriver entrance of the suction jig through the passage of the suction jig to the suction head; and a vacuum port located on the cylindrical body and connected to the passage of the suction jig.

10. The screwing machine of claim 9, further comprising:

a vacuum source connected to the vacuum port.

11. The screwing machine of claim 1, wherein the blowing jig comprises:

a body having a passage of the blowing jig, wherein an end of the passage of the blowing jig is a screwdriver entrance of the blowing jig;

a clamp nozzle mechanism connected to another end of the passage of the blowing jig, the clamp nozzle mechanism defining the target head; and a screw port located on the body and connected to the passage of the blowing jig.

12. The screwing machine of claim 11, further comprising:

a screw feeding duct connected to the screw port;

a screw feeding device connected to the screw feeding duct for supplying the second screw to the screw feeding duct; and a gas source connected to the screw feeding duct for supplying the second screw to the target head, wherein, when the blowing jig is mounted on the screwing machine and the second moving mechanism drives to move the fastening device relative to the machine frame, the screwdriver of the fastening device passes through the passage of the blowing jig to the target head of the blowing jig.

* * * * *